United States Patent [19]

Mitsui

[11] Patent Number: 5,263,159
[45] Date of Patent: Nov. 16, 1993

[54] INFORMATION RETRIEVAL BASED ON RANK-ORDERED CUMULATIVE QUERY SCORES CALCULATED FROM WEIGHTS OF ALL KEYWORDS IN AN INVERTED INDEX FILE FOR MINIMIZING ACCESS TO A MAIN DATABASE

[75] Inventor: Kinichi Mitsui, Kawasaki, Japan

[73] Assignee: International Business Machines Corporation, Armonk, N.Y.

[21] Appl. No.: 584,305

[22] Filed: Sep. 18, 1990

[30] Foreign Application Priority Data

Sep. 20, 1989 [JP] Japan .................. 1-242421

[51] Int. Cl.⁵ .............................. G06F 15/40
[52] U.S. Cl. .................. 395/600; 364/DIG. 2;
364/963.1; 364/963.3; 364/974; 364/252.4;
364/282.1
[58] Field of Search ............ 395/600; 364/DIG. 1, 364/DIG. 2

[56] References Cited

U.S. PATENT DOCUMENTS

| | | | |
|---|---|---|---|
| 3,670,310 | 6/1972 | Bharwani et al. | 340/172.5 |
| 4,318,184 | 3/1982 | Millett et al. | 364/900 |
| 4,817,036 | 3/1989 | Millett et al. | 364/900 |
| 4,823,306 | 4/1989 | Barbic et al. | 364/900 |

OTHER PUBLICATIONS

C. J. van Rijsbergen, Information Retrieval. Butterworths, 1975.
B. C. Vickery, On Retrieval System Theory Butterworths, 1961.
C. Faloutsos "Access Methods for Text" in ACM Computing Surveys. vol. 17, No. 2 (Mar. 1985) pp. 49-74.
G. Salton, The Smart Retrieval System. Prentice-Hall, 1971.
Salton et al., "Extended Boolean Information Retrieval", Communications of the ACM, vol. 26, No. 11, pp. 1022-1036, Dec. 1983.

*Primary Examiner*—Thomas C. Lee
*Assistant Examiner*—Peter Y. Wang
*Attorney, Agent, or Firm*—G. Marlin Knight

[57] ABSTRACT

A method and system are described for increasing quantitative database retrieval processing speed by minimizing access to the sequential file to the smallest possible value by use of score calculations using only the transposed file to rank the retrieval objects and terminating the process at a specified number of retrieval objects. Access to the transposed file is minimized by avoiding accessing unnecessary parts as much as possible, through the calculation of an anticipated score value which is used to make decisions about the optimum time for stopping the retrieval process. Further efficiencies are described through the use of relaxed order-ranking conditions which allow the process to be logically terminated even before the specified number of retrieval objects have been absolutely determined.

3 Claims, 5 Drawing Sheets

TRANSPOSED FILE (11)

QUERY
1.0K1+0.6K2+0.3K3
HIGHEST TWO DOCUMENTS

SEQUENTIAL FILE (15)

MAIN MEMORY

INFORMATION RETRIEVAL BASED ON RANK-ORDERED CUMULATIVE QUERY SCORES CALCULATED FROM WEIGHTS OF ALL KEYWORDS IN AN INVERTED INDEX FILE FOR MINIMIZING ACCESS TO A MAIN DATABASE

TECHNICAL FIELD

The present invention relates to the field of computerized quantitative information retrieval and particularly to enhanced performance of quantitative retrieval through reduction of the frequency of access to external storage.

BACKGROUND OF THE INVENTION

Quantitative retrieval involves calculating scores for retrieval objects based on an information retrieval query and, then, outputting the retrieval objects sequentially from the one with the highest score on down. The retrieval objects may refer to documents or patent information, etc. Order-ranking is done to flexibly address queries which are sometimes ambiguous or imperfect by quantitatively handling the retrieval conditions. An example of quantitative retrieval is shown in FIG. 5. Here, the description is taken with documents as an example of retrieval objects. Each document is assumed to be given a keyword which is used for its retrieval and a numerically represented attribute such as the publication year. The retrieval conditions are assumed to be that the document shall have K1 or K2 as its keyword, and that the value of the publication year C1 shall be as large as possible. A score V1 is given when a document contains K1, a score of V2 when it contains K2, and V3 in correspondence with the value of C1, and the total score is given by their sum, whereby it is possible to give each document its score.

An expression of the score calculation in a numerical formula is given by $$V1*K1 + V2*K2 + f(C1).$$

If a document contains K1 and K2, 1 is substituted for K1 and K2; if not, then 0 is substituted. $f( )$ is assumed to be a function which is 1 when the publication year is the latest and which has smaller values, the older the publication year. In this way, the score may be calculated. By calculating the scores for all documents to rank them by order, it is possible to output the results in sequence from the document which best meets the conditions.

The formula for calculating the score is not limited to an operation such as calculating a sum. A system of selecting the larger of two values, for example, max(V1*K1, V2*K2) may be applied. In this way, various score calculating methods may be contemplated for retrieval requests.

Generally, the number of retrieval objects is very large and it is impractical to access all of retrieval objects every time a query is made because of the need to access a large amount of external storage. As introduced in an article by Salton, et al., "Extended Boolean Information Retrieval", Communications of the ACM, Vol. 26 No. 12, 1983, a transposed file is utilized for making retrievals at high speed in this type of information retrieval. This procedure is shown in FIG. 2. The transposed file (21) permits retrieval objects having the values of keywords and numerical values to be traced with these values as indexes. The original file on which documents are arranged in good sequence is called a sequential file (24). It does not matter whether the contents of each document are contained in the sequential file or are stored outside of it. In the latter case, the information about the position where the contents of the document are stored should be included in the sequential file. Using this transposed file, all document identifiers which have at least one of the keywords and/or the numerical values necessary for calculating scores are determined. This may be done by summing sets of document identifiers corresponding to respective keywords and/or numerical values (22). The sequential file is accessed for respective document identifiers; sets of keywords are obtained; and the scores are calculated, ranked by order, and output (23). When a transposed file is used in this way, the need for accessing all documents to calculate the scores is generally obviated enabling the retrieval to be made more rapidly. Although the transposed file also needs to be stored in an external storage, information having the same indexes are stored in physical proximity, thus enabling the necessary content to be extracted with small access frequency through the indexes.

Since the sequential file and the transposed file are very large in information retrieval, they are kept in an external storage and parts of them are transferred to the internal memory to make decisions as to the retrieval conditions and for calculation of scores, etc. Since a relatively long time is required for accessing the external storage, it is preferable to access the external storage as infrequently as practical for attainment of higher retrieval speed. In the above-described conventional method, the frequency of access to the external storage is reduced by narrowing the range of the related objects of retrieval by initially utilizing a transposed file. However, in quantitative retrieval generally outputting objects with sufficiently high scores is required, but those with low scores are not necessary. On this account, accessing objects low in rank order of the sequential file according to the above-described method is unnecessary. In the case of numerical values, where many factors have a bearing on the score, accessing all such related objects will reduce the range-narrowing effect. A new method and system for quantitative retrieval are needed to provide an effective way to reduce the frequency of access to the external file.

SUMMARY OF THE INVENTION

The means for solving the problems may be summarized by the following 4 points:

1. Rank information in the order of only that of a transposed file.
2. Access part of the transposed file for order-ranking, but avoid accessing unnecessary parts as much as possible.
3. In regard to numerical values, consider a structure similar to that of the transposed file and do not access parts unnecessary for order-ranking.
4. Use relaxed order-ranking conditions to reduce the frequency of accessing the transposed file.

PREFERRED EMBODIMENT

(1) Basic Algorithm

Figure 1:
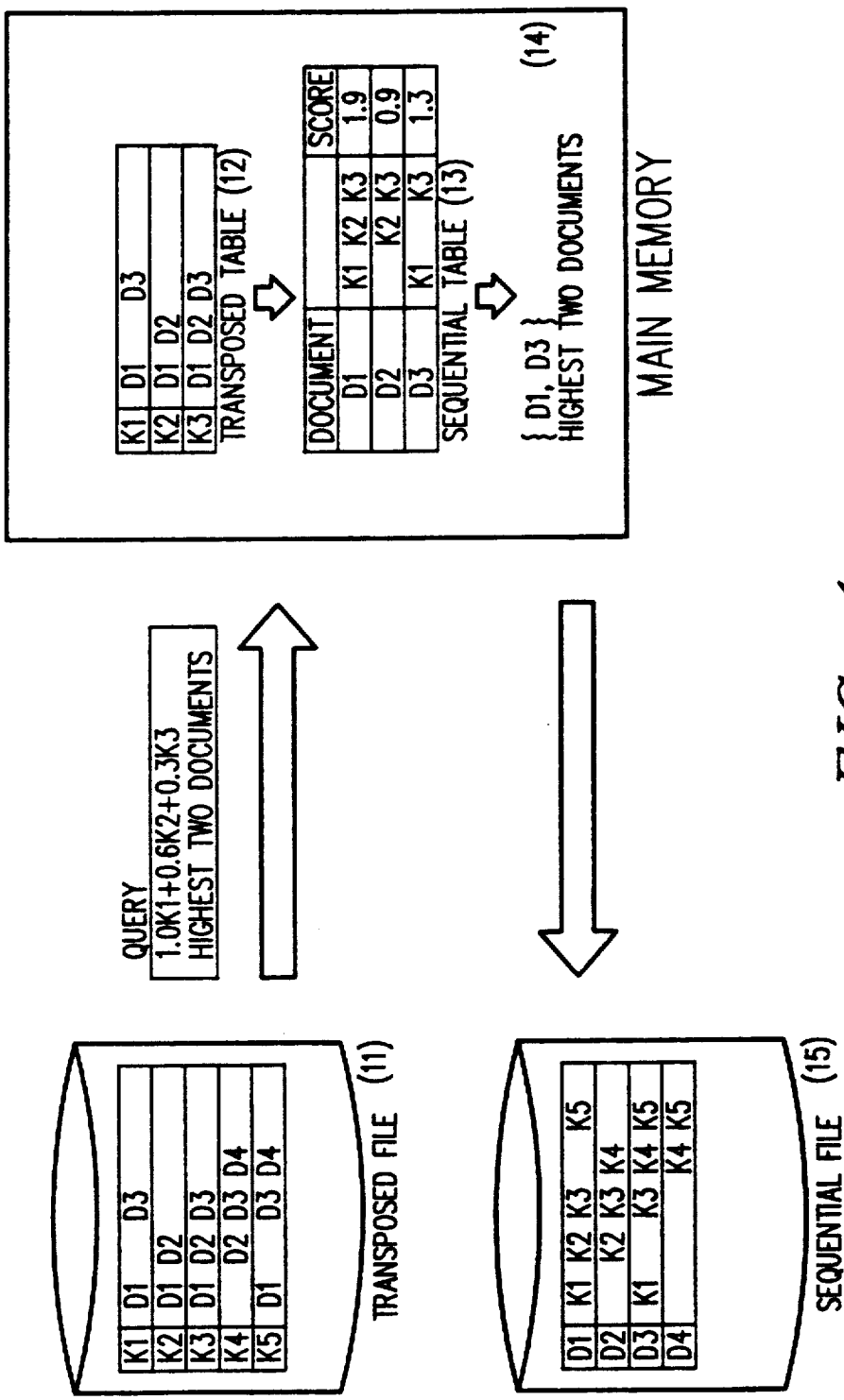
FIG. 1 illustrates the basic operation of the invention.
Figure 2:
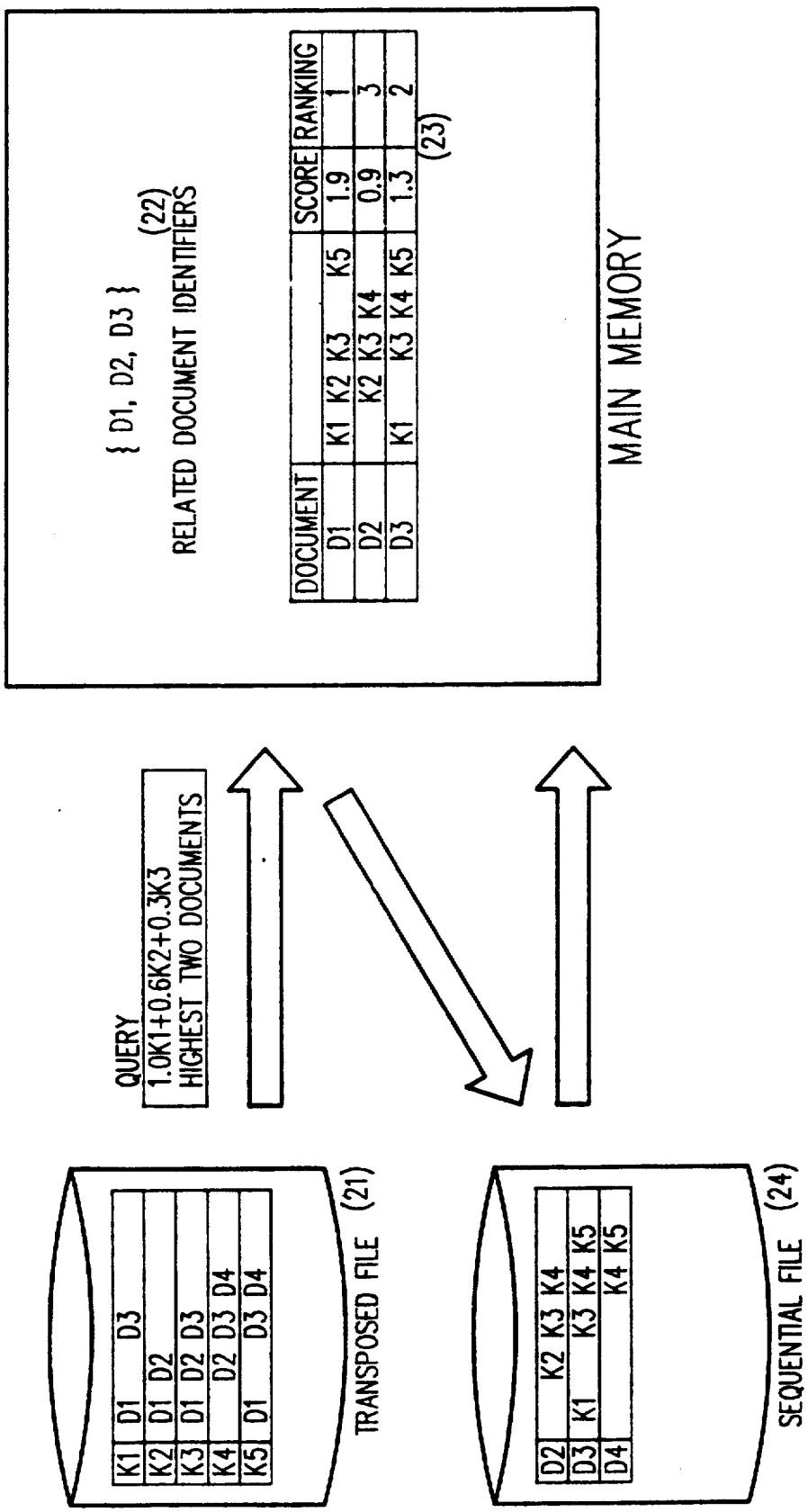
FIG. 2 illustrates the conventional method of retrieval.

The invention is described with reference to FIG. 1. Sets of keywords belonging to document identifiers are stored in a sequential file. In a transposed file, keywords and sets of document identifiers which contain keywords are stored (11). First, a query is given, to obtain the keywords related to the calculation of the scores. The query may be appropriately input through terminal devices. Assuming the query to be $$1.0*K1+0.6*K2+0.3*K3$$

the related keywords are K1, K2 and K3. A transposed file in an external storage is accessed, to prepare a transposed table in the main memory (12). This transposed table is noted to be a part of the transposed file. As the rows and the columns of this transposed table are interchanged, a sequential table (13) is produced. This is noted to be the part of the sequential file necessary for the calculation of the scores. It is possible to calculate scores for individual rows of the sequential table. The sequential file (15) is accessed for the documents with the highest score on down, to extract their contents, thereby accomplishing the retrieval. In the conventional system, the sequential file is accessed, to newly extract the keywords, thereby determining its score, after selecting the related document identifiers through union for individual rows in the transposed table, without performing the operation of interchanging the rows and the columns of the transposed table in the main memory for each document; accordingly access to the sequential file is involved for documents with low scores. When it is sufficient to retrieve those with high scores like those down to the upper N-th order, the conventional method should require additional access to the external storage. Next, the method of this invention and the conventional method are compared in terms of access to the external storage in reference to FIGS. 1 and 2.

I. In the case of the method of this invention represented by FIG. 1:
  A. The transposed file is accessed for keywords K1, K2 and K3.
  B. The sequential file is accessed for document identifiers D1 and D3.

II. In the case of the conventional method represented by FIG. 2:
  A. The transposed file is accessed for keywords K1, K2 and K3.
  B. The sequential file is accessed for document identifiers D1 and D2 and D3.

From the comparison of I with II, it will be understood that because the need for accessing the sequential file for the document identifier D2 is spared, that much access time is saved. Next, the time required for accessing the external storage will be generally evaluated with regard to the method of this invention and the conventional method. First, the codes are defined as follows:

N-qkey: Number of keywords used for query.
N-keydoc: Average number of document identifiers per one keyword on transposed file.
N-rel: Number of related documents which contain at least one of keywords related to the query.
N-out: Number of documents requested to be displayed.
T-inv: Mean time for extracting one record from transposed file.
T-trans: Time required for preparing transposed table in main memory.
T-union: Time required for determining union of sets of documents identifiers for keywords.
T-seq: Mean time required for extracting one record from the sequential file.
T-query: Mean time for calculating the value of query function.
T-sort: Time required for sorting values of query function.

The time required for the approach of this invention is given by:

$$\text{T-inv} \times \text{N-qkey} + \text{T-trans} + \text{T-query} \times \text{N-rel} + \text{T-sort} + \text{T-seq} \times \text{N-out}$$

The first term represents the time required for accessing the transposed file; the second term, the time for preparing a transposed table in the main memory; the third term, the time required for calculating the value of the query function; the fourth term, the time required for sorting; and the fifth term, the time required for accessing the sequential file for a definite number of upper order documents.

In contrast, the time required by the conventional method is given by:

$$\text{T-inv} \times \text{N-qkey} + \text{T-union} + \text{T-seq} \times \text{N-rel} + \text{T-query} \times \text{N-rel} + \text{T-sort}$$

The conventional system is differentiated from the method of this invention in that its second term represents the time for determining the related documents through union and the third term the time required for accessing the sequential file for related documents. Subtracting the required time for the invention system from the required time for the conventional system gives:

$$(\text{T-union} - \text{T-trans}) + \text{T-seq} \times (\text{N-rel} - \text{N-out})$$

In regard to the term (T-union−T-trans), T-trans has a little larger value, since it represents the operation of transposing the transposed table in the method of this invention, as against the calculation of a simple union in the conventional system. However, this operation may be performed, using the hash technique, and the calculation is conducted in the main memory; therefore, the processing can be done at a relatively high speed. Accordingly, the first term is not very large. In contrast, T-seq designates the mean time required for disk access. This value depends on the system, but its typical value is irrelevant. It is normally substantially slower than calculation in the main memory. Accordingly, the smaller the number of documents to be output in comparison to the related documents, the more efficient will become the system of this invention.

The time required for one disk access is, for example, from around several milliseconds (msec) to several tens of msec on the average for medium and large machines. In contrast, experiments performed with the part of the calculation in the main memory programmed in Lisp found the calculation to take less than 1 msec per one retrieval object. The Lisp program involves a very large frequency of calls and, therefore, its processing speed is slow, as compared with ordinary programming languages. Accordingly, the speed is expected to be increased when the same calculations are made using common procedural type languages. In large machines high speeds of disk access are obtained, but in lower level machine types, the gap between the calculation in the main memory and the disk access is considered to be even larger.

It may be concluded from the above description that according to this invention, increased speed is obtained by accessing only the part really necessary for the output from the sequential file. When only a small number of related documents are to be output in a situation where the disk access is relatively slow, as compared with the speed of calculation, this method is more efficient than the conventional method.

The order of calculation of T-trans and T-union is briefly commented upon as follows. In transposing the transposed table, first, a hash table with the document identifiers as keys is prepared; then, the corresponding keywords are added to the corresponding positions on the hash table for respective document identifiers gathered from the transposed file. Assuming that the average number of documents containing a certain keyword is constant, the calculation is of linear order relative to the number of keywords. Similarly, the part where related documents are determined through union can be calculated on linear order. With regard to the number of documents, with increases in the number of documents, the number of documents containing a certain keyword increases on linear order. The above discussion suggests that linear order is applicable also to the number of documents. Thus, these two systems, as compared hereinabove, have the property that the calculation of T-trans and T-union is made on a linear order basis, with regard to the calling length or the size of data base.

While in the conventional system, a reference table of document identifiers and the keywords contained in the respective pertinent documents needs to be contained in the sequential file, this basic algorithm does not invariably require such a table.

(2) Improved Algorithm

Figure 3:
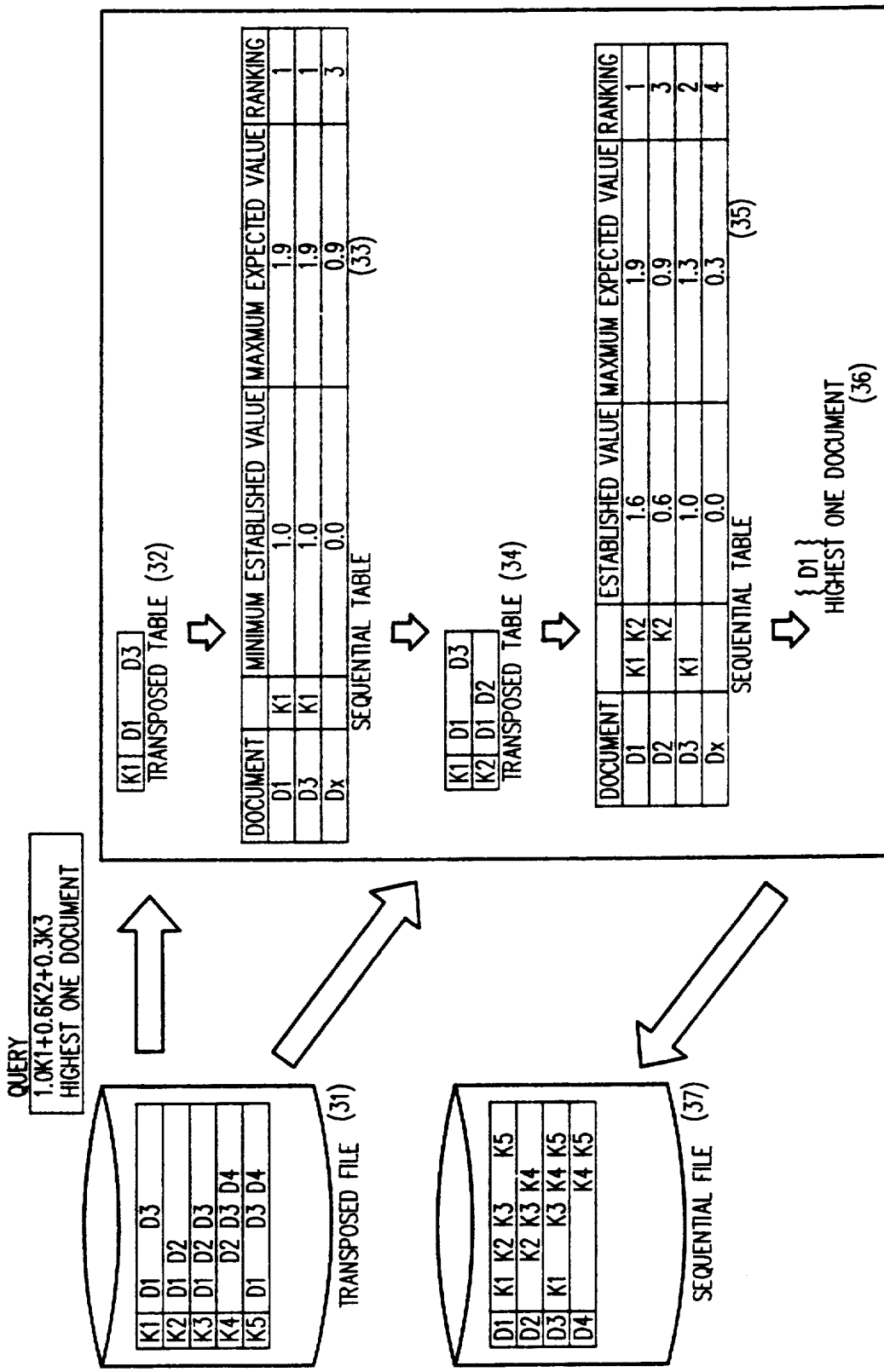
FIG. 3 illustrates the improved algorithm, which constitutes a second essential point of this invention.

An improvement for further reducing the frequency of accessing the transposed file with the above-described method as a basis is described. This process is shown in FIG. 3. In accessing the transposed file with the keywords related to the calculation of the scores as bases, access should be had from the most influential keyword on down with regard to rank order. In the example of FIG. 3, the weight of K1 is the largest, so that documents containing this keyword and those not containing it are very different. The transposed file (31) is accessed for K1, to draw up a transposed table in the main memory (32). Further, the rows and the columns are interchanged (33). A minimum established value and a maximum anticipated value of the score may be determined for each document. The minimum established value in this example is the lower limit of the score calculated from only the keyword which has been examined up to this stage, and the maximum anticipated value is the upper limit of the score, when the remaining keywords are assumed to meet all the query conditions. Dx in FIG. 3 represents all remaining documents. At this point, tentative rank orders are given according to the orders of the minimum established values. If it is sufficient to take the data down to the second order as the final result, documents at the third order or below will not rise above the second order, which is understood without examining remaining keywords, because the maximum anticipated values at the third or below are smaller than the minimum established value at the second order. In this instance, it is proper to access documents down to the second order on the sequential file, to obtain the exact score by examining the keyword. Accordingly, when the basic algorithm of this invention is applied, it is sufficient to access the transposed file for the keyword K1, where access to the transposed file for keywords K1, K2, and K3 has formerly been required, and therefore, the access time is reduced.

If, in this example, the condition is to take down to the upper first order, the first order can not be determined, unless another keyword is examined, because the maximum anticipated value at the second order is larger than the minimum established value at the first order. When selecting a keyword to be examined next, the one which will maximize the minimum established value at the N-th order and which will minimize the maximum anticipated value at the $(N+1)$-th order should be selected. In this example, K2 is selected (34) and the score is again calculated (35). This table indicates that the minimum established value at the first order exceeds the maximum anticipated value at the second order; therefore, the sequential file is accessed for that document identifier (36), thereby ending the retrieval. This system will not necessarily require accessing the transposed file regarding all keywords contained in the query, and thereby affects an enhancement of performance.

In the example of FIG. 3, the query is expressed as a linear combination of access keys; therefore, documents down to the N-th order can be established by taking account of the anticipated score value of the document with its query score (established value) at the $(N+1)$-th order. However, if the query contains calculations involving maximum (max) or minimum (min) or comprises access keys having numerical value attributes there is a possibility that anticipated values of documents with their established values at the $(N+2)$-th order or lower will become larger than that of the document with its established value at the $(N+1)$-th order. A processing procedure with this taken into account is formally described hereafter.

1. First select a keyword which makes the largest difference in rank order, then access a transposed file and take into a main memory a set of document identifiers containing the keyword. The method of selecting the keyword is to select the one that makes the largest difference in the score between documents which contain that keyword and those which do not.

2. Add into the main memory the information newly taken into the sequential table and (re)calculate the scores (minimum established value) of the documents in the sequential table, to rank the orders. If the number of the documents retrieved is not more than N repeat steps 1 and 2 with regard to the next keyword. Interchanging rank orders may be done by recalculating the scores for the documents which have been changed without rearranging all documents every time. This may be the practical way of creating the data structure like that in the balance blocks.

3. When the number of documents first exceeds N, a dummy document which does not contain all keywords mentioned before is added in the table at the lowermost order. Of course, such a document has the lowest established value.

4. Assuming that the lowest possible order is at the (N+S)-th, then it is possible to calculate the maximum anticipated value of the score when the document at the (N+S)-th order contains keywords in the ideal way. If the maximum anticipated value at the (N+S)-th order is smaller than the minimum established value at the N-th order, it is evident that the document at the (N+S)-th order or documents at the (N+S)-th order or below could not be ranked at the N-th order or above. At this stage, the information at the (N+S)-th order shall be deleted from the sequential table, with the document at the (N+S-1)-th order newly ranked at the lowermost order.

5. If the lowermost order agrees with the N-th order, the rank orders have now been established down to the N-th order, where the procedure should be stopped. If not, step 4 and 5 should be repeated, until the re-ranking upward of the lowermost order does not occur.

6. If the rank orders have not been established down to the N-th, examine the transposed file, with the next keyword chosen, repeating the steps from 1. If the document at the lowermost order is not the dummy one presumed in 2., that is, after the dummy document has been deleted midway, any documents which have not already been included in the sequential table, even if newly retrieved, may be neglected, because their inability to be ranked above the N-th order has already been established. The way of selecting the next keyword is to choose one which, when included, will most raise the minimum established value at the N-th order, or which, when not included, will most lower the maximum anticipated value at the (N+S)-th order.

Mentioned as an advantage of this system is the fact that the comparison of a minimum established value at the N-th order with a maximum anticipated value at the (N+1)-th order or below is efficiently made by contemplating the lowermost order as the limit for the possibility of any document to be ranked above the N-th order in the future. That is to say, the limit point where any document may be ranked above the N-th order in the future gradually competitively goes up, and the procedure should be stopped just as that limit comes to agree with the N-th order. The maximum anticipated value need not be determined for all documents at the (N+1)-th order or below in the sequential table. Moreover, it is advantageous from the efficiency standpoint not to leave any unnecessary information in the sequential table by deleting the information of the document at the former lowermost order, when competitively raising the lowermost order and, then, neglecting the documents which may be newly retrieved, after the lowermost order has begun competitively going up.

(3) Handling Numerical Attributes

Figure 4:
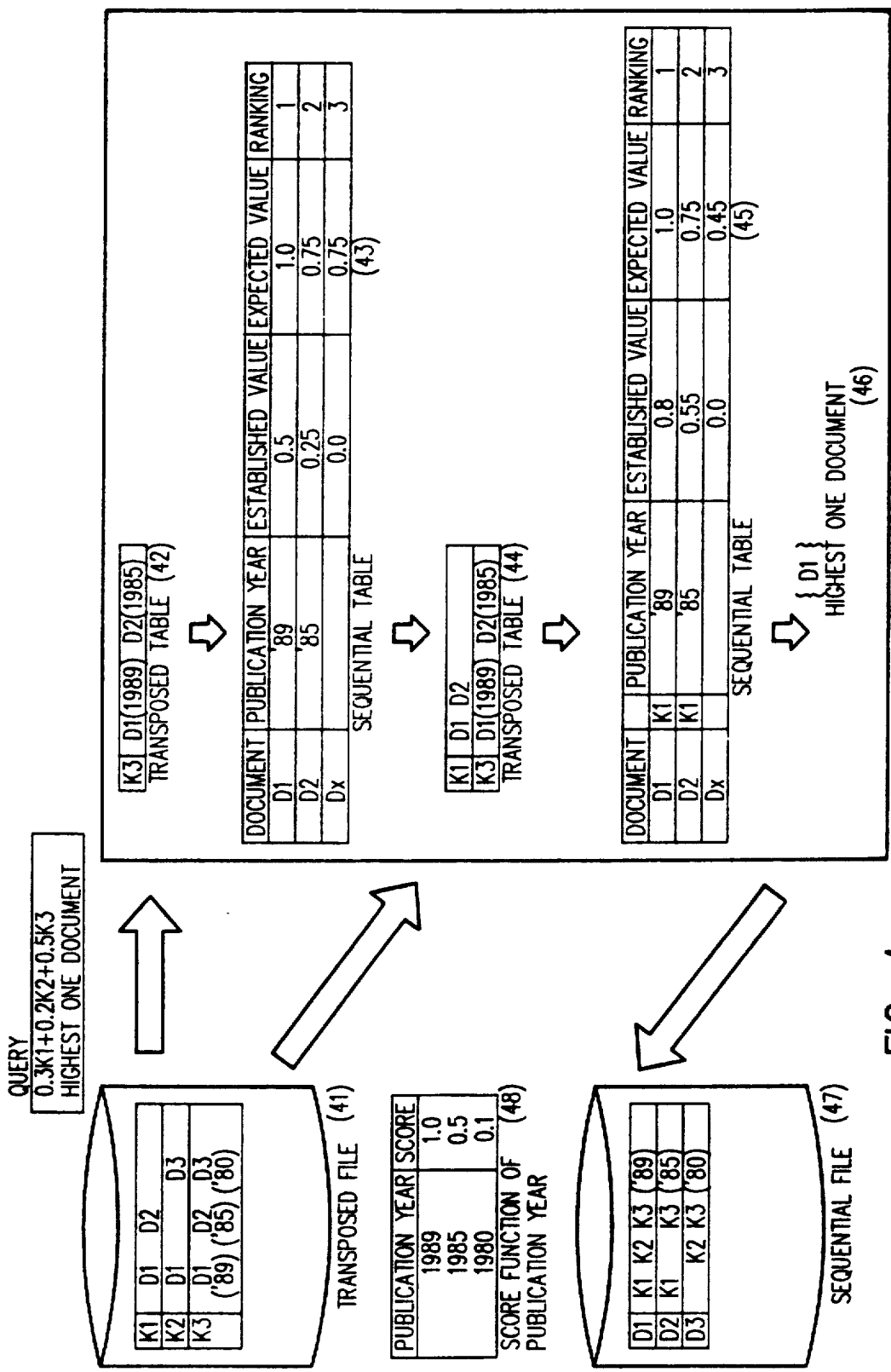
FIG. 4 illustrates a third essential point of this invention where a numerical value attribute is included as a factor of retrieval objects.
Figure 5:
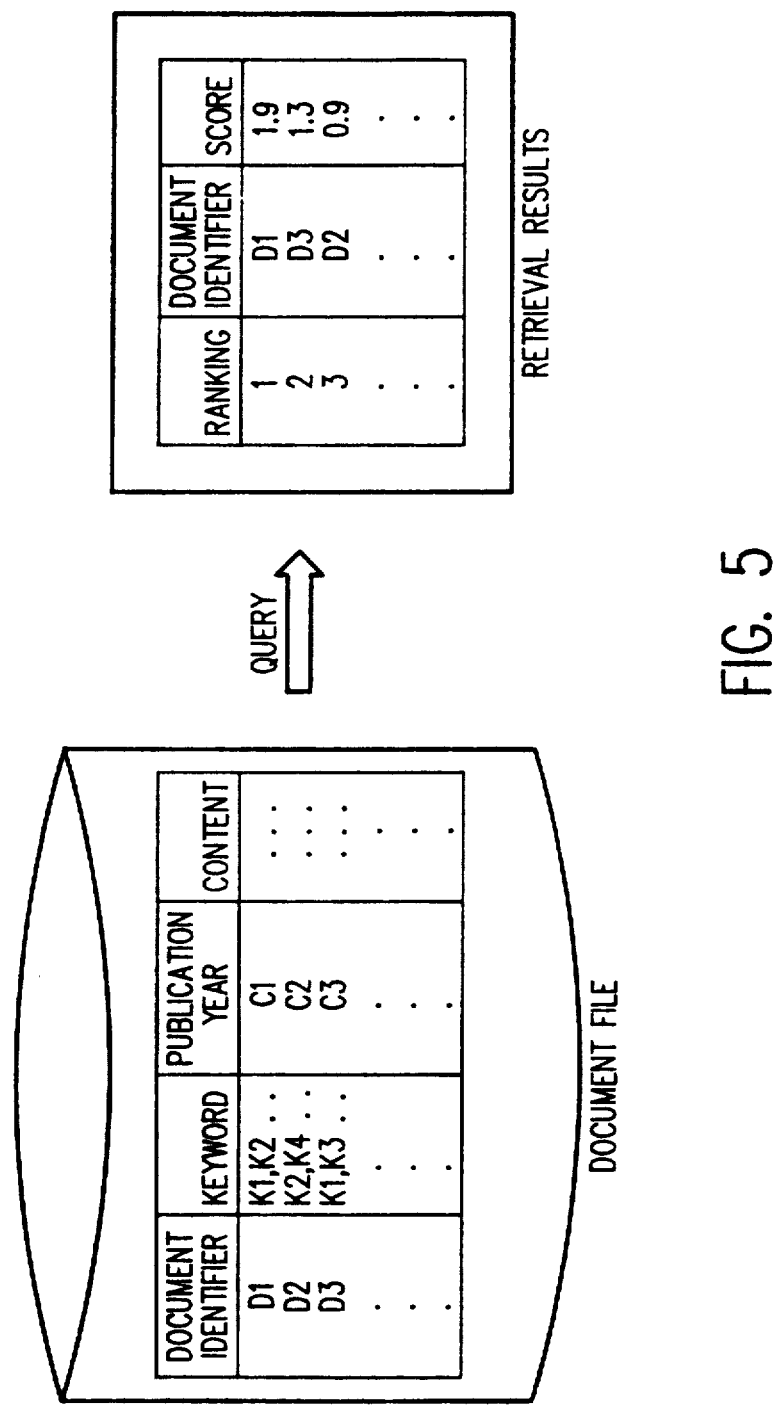
FIG. 5 is a conceptual diagram for explanation of quantitative retrieval.

A method for utilizing a numerical attribute such as a publication year for quantitative retrieval is described. Reference is made to FIG. 4. When calculating the score relative to a numerical attribute, a function which gives a suitable score to an attribute value should be predetermined (48). In the above-described example, it has been expressed by $f(C1)$. This function should change steadily, with changing attribute values. For example, the function might return a larger value the higher attribute or the nearer the attribute value is to a certain value.

With regard to the numerical attribute, a transposed file which conversely but correspondingly relates each attribute value to each retrieval object may be prepared similarly as in the case of keywords. In FIG. 4, K3 denotes a numerical value attribute representing publication year (41). In the transposed file, the retrieval objects are arranged in ascending or descending order of the attribute values, permitting high speed access in ascending or descending order. This may be attained by making use of an existing technique like B-blocks.

When a numerical attribute is generally used as a retrieval condition, the range of values influencing the score is wide, so that frequent access to the external storage is unavoidable when accessing the overall range of the values influencing the score in the transposed file. When outputting only objects with high scores, there is a possibility that it is sufficient to access only the parts which give high scores, where the record of the numerical attribute is concerned. With regard to the access key for the numerical attribute, by utilizing a transposed file on which the retrieval object identifiers are sorted in the attribute order beforehand, the external storage is accessed sequentially from the part where the highest score may be obtained and, then, the retrieval may be ended at a point when the high rank orders have been established, while calculating the minimum established values and the maximum anticipated values, similarly as in the system described in (2).

According to the algorithms described above, after a key has been once used, it is never used again, but when a numerical attribute key is handled, there is a possibility of reusing the key, so long as any document identifiers with function values higher than 0 remain in the transposed file. However, after the key has been used, the maximum weight expected from the key is updated to its maximum anticipated value. Accordingly, depending on this value, there is a possibility of another key being used as the next key.

In the example of FIG. 4, the one of the three terms of the query formula which can take a maximum value is 0.5K3 and, therefore, the publication year (K3) is chosen as the factor which most affects the score. The score is assumed to be higher, the later the document issued was. As the transposed file is accessed once, some number of document identifiers with high scores are obtained (42). Similarly as in the method of (2), a sequential table is prepared in the main memory to calculate the minimum established values and the maximum anticipated values (43). If the rank orders down to the N-th can not be established, the same procedure should be repeated, with the keyword or attribute including publication year to be examined next selected (44 and 45). It should be done so that when calculating the maximum anticipated value, the scores following the numerical values will always become smaller than those preceding them. For example, for the anticipated value for Dx in (45), a maximum of $0.5 \times 0.5 = 0.25$ may be expected for the publication year, 0.2 is added thereto, assuming it contains K2; then, the overall score will be 0.45 at the maximum. In this way, with regard to the transposed file, by having earlier access to parts which have larger effect on score, it is possible to avoid accessing unnecessary parts of the transposed file.

While this system has been described as an inventive idea for a numerical value attribute, when each keyword contained by individual retrieval objects is weighted with a score as a keyword attribute, for example, when a keyword Kx has a weight of 1.0 for a document D1, but it has a weight of only 0.5 for another document D2, the discussion above described is quite similarly applicable, with the identifiers of the retrieval objects for each keyword arranged on the transposed file in the order of their weights.

(4) Slack Order-ranking

In the descriptions (2) and (3), a minimum established value at the N-th order and the maximum anticipated value at the (N+1)-th order or below are compared in judging whether the access to the transposed file is to be stopped or continued. In contrast, if said judgment is made by comparison of a minimum established value at the N-th order with a maximum anticipated value at the (N+M)-th order (M>2) or below, such difference between the N-th order and the (N+M)-th order or below may be expected to be larger than that between the N-th order and the (N+1)-th order or below, making it possible to accomplish the determination of rank order more rapidly. As a particular processing procedure, steps similar to 1 through 6 described in the section "(2) Improved Algorithm" may be employed, except that the procedure is stopped at the point when the lowest order agrees with the (N+M)-th order.

However, the meaning of rank order is such that it can only be said that documents with rank orders down to the N-th may be ranked within the (N+M)-th at the procedure ending point. Conversely, objects with rank orders within the (N+M)-th but outside the N-th include ones which may be finally ranked below the (N+M)-th. In order to find out documents which are truly ranked within the N-th order from among those with established rank orders within the (N+M)-th, it is proper to access the sequential file for documents ranked within the (N+M)-th order, to strictly calculate the score just as previously performed, or let a human make the selection, after outputting all the contents of the documents.

As an extreme example, if M is the total number of the retrieval objects, it can be said that rank orders down to the N-th are included within the M-th, without examining the retrieval conditions. Using such a large M is meaningless, because numerous superfluous results will occur, but with a suitable size M, this approach will provide a faster means for finding objects at orders down to the N-th.

Basically quantitative retrieval is a means for processing ambiguous queries. In this context, ending the retrieval process to output the result at a stage when a range of retrieval objects with high scores have been narrowed down to a certain extent is believed to be reasonable, if accelerated retrieval is attainable thereby.

What is claimed is:

1. An information retrieval method for use in a computer having a processor, an external storage, a main memory into which data from the external storage can be copied, a sequential file stored in the external storage containing a plurality of retrieval objects, each retrieval object having a unique retrieval object identifier, a transposed file stored in the external storage in which access keys are associated with a set of retrieval object identifiers, and a query inputting device for specifying a query expressed as a combination of access keys given weighting coefficients and a number N of retrieval objects to be output, the information retrieval method comprising the steps of:

selecting, using the processor, an access key in the query having the highest weighting coefficient which has not been previously selected, responsive to the inputting of a query;

copying data into the main memory from the transposed file which contains the retrieval object identifiers which are associated with the selected access key;

calculating, using the processor, for each retrieval object identifier a cumulative query score by adding the weighting coefficient for the selected access key to a previously calculated cumulative query score, if any, for each retrieval object which contains the selected access key;

determining, using the processor, for each retrieval object a maximum anticipated score by adding the weighting coefficient for all access keys not previously selected to a previously calculated cumulative query score, if any, for each retrieval object identifier;

ranking, using the processor, the cumulative query scores for retrieval object identifiers from highest to lowest to create a rank list;

repeating the selecting, copying, calculating, determining and ranking steps until all access keys in the query have been selected or the cumulative query score at the N-th element in the rank list exceeds the maximum anticipated score for any retrieval object with a cumulative query score at the (N+1)-th element in the rank list or below; and reading N retrieval objects corresponding to the N retrieval object identifiers having the highest cumulative query scores from the sequential file into the main memory.

2. An information retrieval method for use in a computer having a processor, an external storage, a main memory into which data from the external storage can be copied, a sequential file stored in the external storage containing a plurality of retrieval objects, each retrieval object having a unique retrieval object identifier, a transposed file stored in the external storage in which access keys are associated with a set of retrieval object identifiers and a query inputting device for specifying a query expressed as a combination of access keys given weighting coefficients and a number N of retrieval objects to be output, the information retrieval method comprising the steps of:

selecting, using the processor, an access key in the query having the highest weighting coefficient which has not been previously selected, responsive to the inputting of a query;

copying data into the main memory from the transposed file which contains the retrieval object identifiers which are associated with the selected access key;

calculating, using the processor, for each retrieval object identifier a cumulative query score by adding the weighting coefficient for the selected access key to a previously calculated cumulative query score, if any, for each retrieval object which contains the selected access key;

determining, using the processor, for each retrieval object a maximum anticipated score by adding the weighting coefficient for all access keys not previously selected to a previously calculated cumulative query score, if any, for each retrieval object identifier;

ranking, using the processor, the cumulative query scores for retrieval object identifiers from highest to lowest to create a rank list;

repeating the selecting, copying, calculating, determining and ranking steps until all access keys in the query have been selected or the cumulative query score at the N-th element in the rank list exceeds the maximum anticipated score for any retrieval object identifier with a cumulative query score at the (N+M)-th element in the rank list or below (where M is a pre-selected integer greater than 2); and reading the sequential file for N+M retrieval objects corresponding to the N+M retrieval object identifiers having the highest cumulative query scores from the sequential file into the main memory.

3. An information retrieval system having a processor, an external storage, a main memory into which data from the external storage can be copied, a sequential file stored in an external storage containing a plurality of retrieval objects, each retrieval object having a unique retrieval object identifier, a transposed file stored in the external storage in which access keys are associated with a set of retrieval object identifiers, and a query inputting device for specifying a query expressed as a combination of access keys given weighting coefficients and a number N of retrieval objects to be output, the information retrieval system comprising:

means for selecting, using the processor, from among the access keys which have not been previously selected, an access key in the query having the highest weighting coefficient, responsive to the inputting of a query;

means for copying data into the main memory from the transposed file which contains the retrieval object identifiers which are associated with the selected access key;

means for calculating, using the processor, a cumulative query score and a maximum anticipated score for each retrieval object identifier based on the query and the data copied from the transposed file, the cumulative query score being found by adding the weighting coefficient for the selected access key to a previously calculated cumulative query score, if any, and to zero if there is no previously calculated cumulative query score, for each retrieval object which contains the selected access key and the maximum anticipated score being found by adding the weighting coefficient for all access keys not previously selected to a previously calculated cumulative query score for each retrieval object identifier;

means for ranking, using the processor, the cumulative query scores for retrieval object identifiers from highest to lowest to form a rank list;

means for repeatedly activating the selecting, copying, calculating and ranking means until all access keys in the query have been selected or the cumulative query score at the N-th element of the rank list exceeds the maximum anticipated score for any retrieval object identifier with a cumulative query score at the (N+1)-th rank or below; and means for reading the sequential file for N retrieval objects corresponding to the N retrieval object identifiers having the highest cumulative query scores.

* * * * *